Feb. 19, 1963 S. J. MICHALAK, JR Re. 25,334

PISTON CYLINDER APPARATUS

Original Filed March 22, 1951

INVENTOR.
Stanley Michalak
BY
Frank E. Liverance, Jr.
Attorney

United States Patent Office

Re. 25,334
Reissued Feb. 19, 1963

25,334

PISTON CYLINDER APPARATUS

Stanley J. Michalak, Jr., West Olive, Mich., assignor to Mechanical Power Corporation, Grandville, Mich., a corporation of Michigan Original No. 2,625,910, dated Jan. 20, 1953, Ser. No. 216,921, Mar. 22, 1951. Application for reissue July 13, 1962, Ser. No. 210,612

12 Claims. (Cl. 121—40)

Matter enclosed in heavy brackets [ ] appears in the original patent but forms no part of this reissue specification; matter printed in italics indicates the additions made by reissue.

This invention relates to a novel and very useful pneumatic rod actuating apparatus, wherein a piston actuated rod may be forced outwardly at one end of a cylinder against a stop of any type whereupon, automatically within the cylinder, a lock is brought into operation which maintains the rod in its outermost position and prevents any return thereof, which, without such lock would be possible upon a pressure greater than yielding fluid pressure against a piston within the cylinder operatively connected with the rod, or upon a sufficient diminution of such pressure.

With my invention, positive clamping may be obtained by the use of fluid pressure, or a preselected stopping of the pressure actuated rod obtained without variations or uncertainties because of variations in the fluid pressure used. Also with my invention, a release and return of the rod to its initial position is automatically accomplished by reversing the flow of fluid pressure. It is an object and purpose of the present invention to provide an apparatus of the character described which is particularly effective for the purposes for which it has been designed, sturdy and not liable to get out of order, and which may be economically produced.

An understanding of the invention may be had from the following description, taken in connection with the accompanying drawing, in which, FIG. 1 is a longitudinal vertical section through the piston cylinder apparatus of my invention, with the piston at substantially one extreme of its movement.

Like reference characters refer to like parts in the different figures of the drawing.

Figure 1:
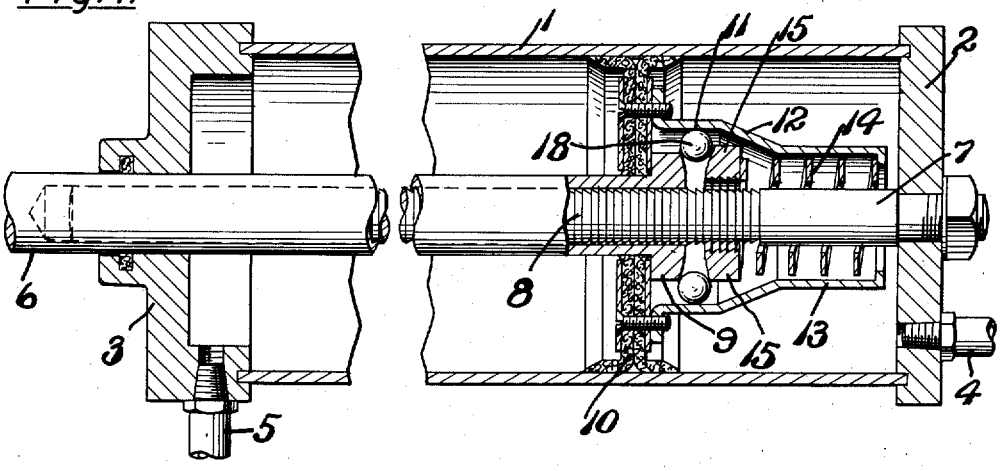

A cylinder 1, shown horizontally located, is closed at one end by a circular plate 2 and at the other end by a head 3. Pipes indicated at 4 and 5 connected with the parts 2 and 3, respectively, are for the conduction into and exhaust out of the cylinder at opposite ends thereof of fluid pressure, said pipes being adapted to carry a pressure fluid which in practice, preferably, will be compressed air.

A rod 6 extends centrally through the head 3 and at its inner end portion is axially bored for a distance into which the free end portion of an axially located rod 7 extends and is guided. The rod 7 is securely connected to the cylinder closure 2, extends the full length of the cylinder and beyond the outer side of the head 3 and, for the major portion of its length from its free end toward but short of its opposite end, is formed with a consecutive series of annular grooves 8, producing serrated annular ribs preferably, of the type and form best shown in FIG. 2.

The rod 6 at its iner end is equipped with a head 9.

Figure 2:
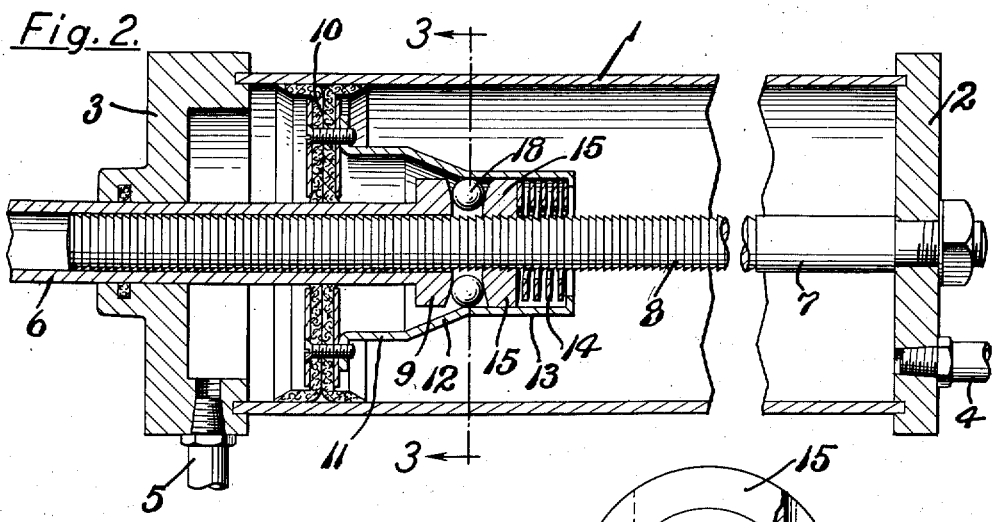
FIG. 2 is a similar section showing the piston in another position, substantially at the opposite extreme of its movement.
Figure 3:
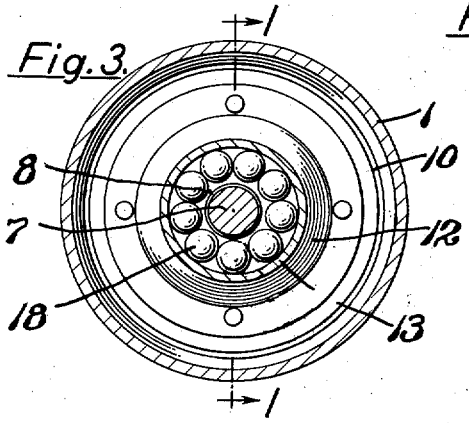
FIG. 3 is a horizontal vertical section substantially on the plane of line 3—3 of FIG. 2

Around the rod between said head 9 and the head 3 a piston 10 is located, sufficiently loose upon the rod that it may have a relative movement with respect thereto, from a position as in FIG. 1 against the head 9 to other positions, one shown in FIG. 2, away from said head. The piston in practice is made of two back to back cup leathers, the outer flanges of which bear against the inner sides of the cylinder 1, while the web portions or bottoms of such cup leathers, at the central opening therein through which the rod 6 passes, are snug against the rod, the piston permitting substantially no passage of compressed air from one side thereof to the other.

At what may be termed the inner side of the piston, a housing of sheet or flat metal is permanently secured. It comprises three sections, a larger diameter section 11 flanged at its free end for screws to pass through the piston and through said flange to connect the housing to the piston, an intermediate conical section 12 and an inner end section 13 of circular cross section of lesser diameter which, at its free end, is provided with an inturned annular flange against which one end of a flat wire coiled compression spring 14 seats. The rod 7 passes through the described housing and is surrounded at its grooved portion 8 by the spring 14, which is a compression spring of relatively heavy strength.

Figure 4:
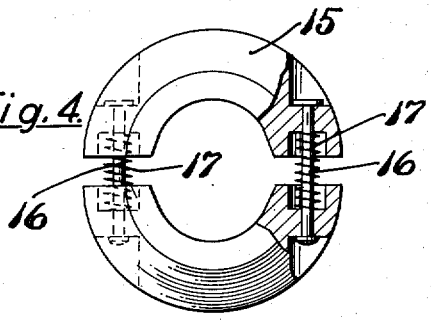
FIG. 4 is an enlarged elevation of the split locking nut which is automatically moved to operative position upon the outward movement of the piston rod to a predetermined position.

The opposite end of the spring 14 bears against a split or divided nut having two half circular segments 15, the adjacent ends of which when together provide a substantially circular ring, but which are normally separated from each other. Rods 16 as shown in FIG. 4 extend from the end portions of one of the parts 15 to the adjacent end portions of the other part with coiled compression springs 17 of light strength around the rods which, when free to do so, separate the two parts 15 from each other as in FIG. 4. The exterior diameter of the divided nut, when the two parts are brought together, is substantially the same as the interior diameter of the section 13 of the housing described, so that when located in such section 13, the two parts of the nut 15 are forced toward each other, compressing the springs 17 and engaging the grooves 8 on the rods 7, the interior opening through the split nut being grooved complementary to the grooves 8. Therefore, when the nut is in the described position shown in FIG. 2, it has a holding or locking engagement therewith.

Between the outer side of the head 1 and the adjacent side of the parts 15 of the split or divided nut a plurality of balls 18 are located. The head 9 and the adjacent side of the parts 15, at their outer portions, diverge from each other as shown.

With the parts as shown in FIG. 1, the two parts 15 of the split nut are separated by the springs 17, and the balls 18 are forced outwardly so as to bear against the inner sides of the section 11 of the housing. On introducing compressed air or an equivalent pressure fluid through the pipe 4, *and upon rod 6 encountering a force greater than the compressive strength of spring 14,* the pressure will force the piston 10 from the position shown in FIG. 1 toward that shown in FIG. 2 the piston moving away from the head 9 and moving the housing with it. The *split nut 15 and balls 18,* [being] *which are* held between the head 9 on the rod 6 and the parts 15 of the split nut, will move relatively to the housing so as to engage against the conical section 12, and will be forced inwardly toward each other until the smaller diameter section 13 is reached, whereupon the parts 15 will be forced toward each other, overcoming springs 17 when said parts enter the section 13 of the housing and bringing the serrated teeth at the sides of the opening through the nut into firm connection with the serrated grooves 8 on the rod 7.

During this movement the rod 6 will be moved outwardly unit it is stopped either at a preselected outer position or until it comes up against material which is to be clamped between the outer end of the rod and abutment. Thereupon, the piston and the housing will continue movement until the nut parts 15 engage with the teeth and grooves 8 of the rod 7.

*This engagement occurs while the balls 18 are still in rolling engagement with the conical section 12 and thus before they enter the section 13. The pressure in the cylinder, being greater than the compressive strength of spring 14, continues to move piston 10 and the housing to the position of FIG. 2. During this movement, the balls 18 are forced like a wedge between the leveled cam surfaces of head 9 and split nut 15 and in so doing, by reason of the mechanical advantage obtained thereby, a greater force is exerted on rod 6 than what normally would be transmitted to rod 6 solely by piston 10 if the piston and rod were attached directly to each other.*

The compressed air or other fluid pressure will maintain the parts in the position shown in FIG. 2, and it is apparent that with said parts 15 of the nut, held against outward movement, and with the balls 18 between them and the head 9, any stopping of the rod 6, regardless of pressure against it tending to return it, will be withstood until the compressed air pressure against the piston is reduced to less than the expansive force of the spring 14. Thus any clamping or other pressure of the rod 6 against what [is] *it* may be pressed will not vary, should compressed air pressure through the pipe 4 into the cylinder change in amount.

On releasing or exhausting the air, controlled by a suitable valve connected with the pipe 4, and the pressure being reduced around the housing and against the adjacent side of the piston to atmospheric pressure, spring 14 returns the piston and housing to the position relative to the head 9 in FIG. 1. Either by manual pressure against the outer end of the rod 6, or by fluid pressure introduced into the cylinder through the pipe 5, the piston may be moved back in the cylinder, carrying rod 6 with it, to the initial position shown in FIG. 1.

The apparatus described mounted, upon a suitable base support, may be used to clamp an article between a clamping head at the outer end of the rod 6 and an abutment. The rod 6 will be moved out rapidly until the article to be clamped, located against such abutment is engaged by a clamping head on such rod 6, after which, leaving the pneumatic pressure on through the pipe 4, the clamp will be locked with the parts 15 shown in the position in FIG. 2. The release is by exhausting the fluid pressure through the pipe 4, and the return is by moving the rod 6 back either by hand or by pneumatic pressure through the pipe 5. Also such device may be used in drilling holes in material to either preselected depths, or through material, stopping the drill very shortly after they have passed through such material. In such case the rod 6 through cooperating stops on it and on an affixed stop means, against which the cooperating stops come, will be stopped at a predetermined position and may have secured to it at its outer end portion, a drill head or unit movable with it and therefore stopped when the drill has penetrated a preselected desired amount.

There are many other uses to which the apparatus may be put, which will occur to those skilled in the art, and the invention is to comprehend all forms of structure accomplishing the same results, however used, by substantially the same means, using structure within the scope of the claims appended, which define the invention.

I claim:

1. In a structure as described, a cylinder, end members closing the ends of the cylinder, a rod slidably mounted and passing through one of said ends of the cylinder, having a head at its inner end, means for conducting fluid pressure into the cylinder at its opposite end, a piston on said rod mounted thereon for movement lengthwise of the rod from said head to a position away from the head, a fixed rod secured to the other end of the *cylinder* [piston], said first mentioned rod having an axial boring therein into which said fixed rod extends and is guided, a housing secured to said piston at a side thereof, located around said fixed rod and around the head of the first mentioned rod, a member within said housing, said fixed rod and said member having interengaging means for connecting them together against movement with respect to each other in one position of said member, means normally maintaining said member out of engagement with said fixed rod, and means automatically operated by movement of said housing when said piston is moved away from the head on the first rod to connect said member with said fixed rod.

2. In a structure as described, a cylinder, ends closing the ends of the cylinder, a rod slidably passing through one end closure of the cylinder and at its inner end having a head, said rod from its inner end having an axial elongated boring, a fixed rod permanently secured to the opposite end of the cylinder extending into said boring in the first rod, a piston on said first rod adapted, in one position, to come against said head on the first rod and mounted on the rod for movement away from said head, means mounted adjacent said fixed rod disengaged therefrom when said piston and head on said first rod are against each other, said means bearing against said head to move said first rod longitudinally when free of the second rod, and adapted to be moved into fixed engagement therewith, and means connected to said piston, movable with it, engaging against and operating said first mentioned means into fixed engagement with said fixed rod when said piston is moved away from said head thereby fixing said means against movement to move said first mentioned rod longitudinally.

3. In a structure as described, a cylinder, end closures for the ends of the cylinder, a rod having an axial boring from its inner end lengthwise thereof slidably passing through one end closure of the cylinder, said rod at its inner end having a head, a piston on said rod movable lengthwise thereof from a position against said head to a position away therefrom, a housing secured to one side of the piston surrounding said head and extending toward the end of the cylinder to which the fixed rod is secured, said rod being telescopically received in the boring of the first rod and from its free end for the major portion of its length having a consecutive series of closely spaced projections thereon, a split, plural part nut surrounding said fixed rod located within the housing, spring means acting to normally separate the parts of the split nut and disengage it from said projections on the fixed rod, said nut surrounding the fixed rod and at its inner side having projections adapted to engage the projections on the fixed rod, a compression spring between said nut and the outer end of the housing, and a series of balls between the outer side of said head and the adjacent side of said split nut, said housing having its greatest cross section at and adjacent the piston in which it is connected, and having a decreased diameter away therefrom, such decreased diameter of the housing being substantially equal interiorly to the exterior diameter of the split nut when it is in engagement with the projections on said fixed rod.

4. A structure as defined in claim 3, said housing having a cylindrical section of largest diameter at the end thereof connected with the piston, an intermediate section having a progressively decreasing diameter from said first section, and an opposite end cylindrical section farthest away from said piston, the interior diameter of said last section being substantially equal to the exterior diameter of the split nut when closed and engaged with the fixed rod.

5. A structure as defined in claim 3, the adjacent sides of the head and split nut converging inwardly toward each other and against which converging sides said balls are adapted to bear, and means for introducing and exhausting a pressure fluid into the cylinder at opposite ends thereof.

6. In a structure as described, a cylinder, end closures for the ends of the cylinder, a rod having a head at its inner end slidably passing through one end closure of the cylinder, said rod from its inner end, and beyond the end of the cylinder through which it passes, having an axial boring, a fixed rod secured to the other end closure of the cylinder telescopically received within said boring and extending through the end of the cylinder through which said first rod passes, said rod from its free end for the major portion of its length having a plurality of successive closely spaced grooves and alternate teeth therearound, a piston on the first mentioned rod movable lengthwise thereof adapted in one position to engage against said head, a hollow housing secured to said piston, surrounding said head and extending toward the end of the cylinder to which the fixed rod is secured, said housing being of a larger diameter where attached to the piston than at its opposite end, a split nut comprising a plurality of connected parts surrounding said rod and located within the housing, spring means normally separating said parts of the split nut from each other, said parts of the nut around said rod having grooves and teeth therein similar to those around said rod, a coiled compression spring between said split nut and the outer end of the housing, and a series of balls within the housing between the outer side of said head and the adjacent side of said split nut.

7. A structure as defined in claim 6, and a conduit for carrying and exhausting compressed air into the cylinder at the side of the piston at which the housing is located, the interior diameter of the larger end portion of said housing being greater than the exterior diameter of said nut when the parts thereof are separated, and the interior diameter of the free end portion of said housing being substantially equal to the exterior diameter of said split nut when the parts thereof are together, adjacent sides of said head and said parts of the fixed nut converging inwardly toward each other and against which side said balls are located.

8. In a structure as described, a cylinder having end closures, a rod slidably passing through one end closure of the cylinder, said rod being axially bored from its inner end lengthwise thereof, a fixed rod secured to the opposite end of the cylinder telescopically received in the first rod, a piston in said cylinder movable lengthwise of and upon the first rod, means limiting the movement of the piston toward the inner end of said first rod, means for entering pressure fluid at the end of the cylinder to which the fixed rod is connected to move said piston, means connected to said piston operatively engaging the inner end of said first rod to move said rod outwardly on entrance of pressure fluid into the cylinder, said last mentioned means including a yielding coiled compression spring which is compressed in length upon resistance being encountered to outward movement by the first rod, whereupon said piston will move lengthwise of said first rod away from the inner end thereof, and means operated by said last mentioned means and actuated thereby to connect it with said fixed rod after said piston has moved lengthwise of the first rod a predetermined distance locking said first rod moving means against movement.

*9. In a structure as described, a cylinder, end members closing the ends of the cylinder; a rod slidably mounted and passing through one of said ends of the cylinder, having a head at its inner end, means for conducting fluid pressure into the cylinder at its opposite end, a piston on said rod mounted thereon for movement lengthwise of the rod from said head to a position away from the head, a fixed rod secured to the other end of the cylinder, said first mentioned rod having an axial boring therein into which said fixed rod extends and is guided, a housing secured to said piston at a side thereof, located around said fixed rod and around the head of the first mentioned rod, a member within said housing, said fixed rod and said member having interengaging means for connecting them together against movement with respect to each other in one position of said member, means normally maintaining said member out of engagement with said fixed rod, and means automatically operated by movement of said housing when said piston is moved away from the head on the first rod to connect said member with said fixed rod providing a stop means; and mechanical advantage means cooperating with said stop means, head, and said piston and housing for creating a greater force on said first mentioned rod than would normally be created solely by said piston if said piston and rod were directly attached to each other.*

*10. In a structure as described, a cylinder, end members closing the ends of the cylinder, a rod slidably mounted and passing through one of said ends of the cylinder, having a head at its inner end, means for conducting fluid pressure into the cylinder at its opposite end, a piston on said rod mounted thereon for movement lengthwise of the rod from said head to a position away from the head, a fixed rod secured to the other end of the cylinder, said first mentioned rod having an axial boring therein into which said fixed rod extends and is guided, a housing secured to said piston at a side thereof, located around said fixed rod and around the head of the first mentioned rod, a member within said housing, said fixed rod and said member having interengaging means for connecting them together against movement with respect to each other in one position of said member, means normally maintaining said member out of engagement with said fixed rod, and means automatically operated by movement of said housing when said piston is moved away from the head on the first rod to connect said member with said fixed rod providing a stop means; and a mechanical advantage wedging means located between said stop means and said head and actuated by the movement of said piston for forcing said head away from said stop means thereby creating a greater force on said first mentioned rod than would normally be created solely by said piston if said piston and rod were directly attached to each other.*

*11. The device of claim 10 in which the wedging means comprises diverging surfaces one operatively associated with the head and the other operatively associated with the stop means; and a plurality of rolling elements riding on said surfaces; and means for forcing said rolling elements between said surfaces in response to movement of said piston thereby forcing said stop means and first mentioned rod apart.*

*12. The device of claim 10 in which the wedging means comprises diverging surfaces one operatively associated with the head and the other operatively associated with the stop means; and a plurality of rolling elements riding on said surfaces; and an elongated cam surface inside said housing and engaging said rolling elements for forcing said rolling elements between said surfaces in response to movement of said piston thereby forcing said stop means and first mentioned rod apart.*

References Cited in the file of this patent or the original patent

UNITED STATES PATENTS

| | | |
|---|---|---|
| 707,015 | Ridgway | Aug. 12, 1902 |
| 2,540,578 | Hall et al. | Feb. 6, 1951 |
| 2,632,425 | Grover | Mar. 24, 1953 |

FOREIGN PATENTS

| | | |
|---|---|---|
| 211,847 | Germany | July 13, 1909 |